(12) United States Patent
Hsi (10) Patent No.: US 9,058,475 B2
(45) Date of Patent: Jun. 16, 2015

(54) ACCOUNT CREATING AND AUTHENTICATING METHOD

(75) Inventor: Chen-Ning Hsi, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 194 days.

(21) Appl. No.: 13/369,539

(22) Filed: Feb. 9, 2012

(65) Prior Publication Data
US 2013/0104205 A1 Apr. 25, 2013

(30) Foreign Application Priority Data
Oct. 19, 2011 (TW) .............................. 100137874 A (51) Int. Cl.
| G06F 7/04 | (2006.01) |
| G06F 15/16 | (2006.01) |
| G06F 17/30 | (2006.01) |
| H04L 29/06 | (2006.01) |
| G06F 21/00 | (2013.01) |
| G06F 21/32 | (2013.01) |
| G06F 21/36 | (2013.01) |

(52) U.S. Cl.
CPC ................ G06F 21/32 (2013.01); G06F 21/36 (2013.01)

(58) Field of Classification Search
CPC ........ G06F 21/32; G06F 21/36; H04L 9/0861
USPC ................ 726/6; 713/182–186; 382/115, 118
See application file for complete search history.

(56) References Cited

U.S. PATENT DOCUMENTS

| 6,922,488 B2 * | 7/2005 | Mastrianni et al. ............ 382/199 |
| 8,499,342 B1 * | 7/2013 | Macwan ............................ 726/7 |
| 2002/0152390 A1 * | 10/2002 | Furuyama et al. ............ 713/185 |
| 2003/0215114 A1 * | 11/2003 | Kyle .............................. 382/115 |
| 2007/0011410 A1 * | 1/2007 | Fukui et al. .................... 711/154 |
| 2007/0061590 A1 * | 3/2007 | Boye et al. .................... 713/186 |
| 2007/0198286 A1 * | 8/2007 | Tomita .............................. 705/1 |

(Continued)

FOREIGN PATENT DOCUMENTS

JP 362079 A * 12/2004 ................ G06T 7/00

OTHER PUBLICATIONS

Three-Dimensional Human Face Feature Extraction From Multi Images Nicola D'Apuzzo and Nobuo Kochi 2003 Gruen, A., Kahmen, H.(Eds.), Optical 3-D Measurement Techniques VI, vol. I, Zurich, Switzerland,pp. 140-147.*
Android 2.3.4 User's Guide May 4, 2011 AUG-2.3.4-105 Android™ mobile technology platform 2.3.4.*

*Primary Examiner* — Christopher Revak
*Assistant Examiner* — Vadim Savenkov
(74) *Attorney, Agent, or Firm* — Kirton McConkie; Evan R. Witt (57) ABSTRACT

An account creating and authenticating method is provided. Firstly, an account is created according to a face image included in a photo. A password corresponding to the face image is also generated by a service system. During an account authenticating method, an image pickup device is used to shoot a face of a login person on the spot. If the service system judges that the shot face image of the login person on the spot complies with a predetermined face image corresponding to an existing account, the login person is allowed to login into the service system and the password is displayed. In a case that the image pickup device is provided, the service system may be authenticated by inputting the password. The method of the present can simplify the process of creating and authenticating the account.

10 Claims, 7 Drawing Sheets

(56) References Cited

U.S. PATENT DOCUMENTS

| | | | |
|---|---|---|---|
| 2007/0253604 A1* | 11/2007 | Inoue et al. | 382/118 |
| 2009/0196510 A1* | 8/2009 | Gokturk et al. | 382/224 |
| 2010/0034432 A1* | 2/2010 | Ono et al. | 382/118 |
| 2010/0115114 A1* | 5/2010 | Headley | 709/229 |
| 2011/0043643 A1* | 2/2011 | Yu et al. | 348/207.1 |
| 2011/0096995 A1* | 4/2011 | Ito | 382/190 |
| 2011/0209192 A1* | 8/2011 | LeClerc Greer et al. | 726/1 |

\* cited by examiner

ACCOUNT CREATING AND AUTHENTICATING METHOD

FIELD OF THE INVENTION

The present invention relates to an account creating and authenticating method, and more particularly to an account creating and authenticating method which is easily operated.

BACKGROUND OF THE INVENTION

With increasing development of science and technology, computers and a variety of electronic devices (e.g. smart phones and tablet personal computers) have experienced great growth and are now rapidly gaining in popularity. Nowadays, the trends of designing electronic devices are developed toward small size and easy portability. On account of their portability, the users can use such electronic devices everywhere they are. Generally, most of the electronic devices have built-in image pickup devices. The built-in image pickup devices are used for shooting photos without the need of using cameras or digital cameras. Consequently, the electronic devices with the image pickup devices are able to directly shoot photos. In addition, these electronic devices have network-enabled capability through a 3G network or a Wi-Fi network. As a consequence, the photos can be easily uploaded to various social networking websites or various network albums. In addition, since various communication programs may be executed to transmit photos, the process of sharing photos becomes very simple.

However, although the above photo sharing gateways (e.g. the social networking websites, the network albums and the communication programs) may be used as the photo sharing tools for the user, it is necessary to create an account in advance. After the account is created, the account should be authenticated. If the account is successfully authenticated, the user can login into the above photo sharing tools to share photos.

Figure 1:
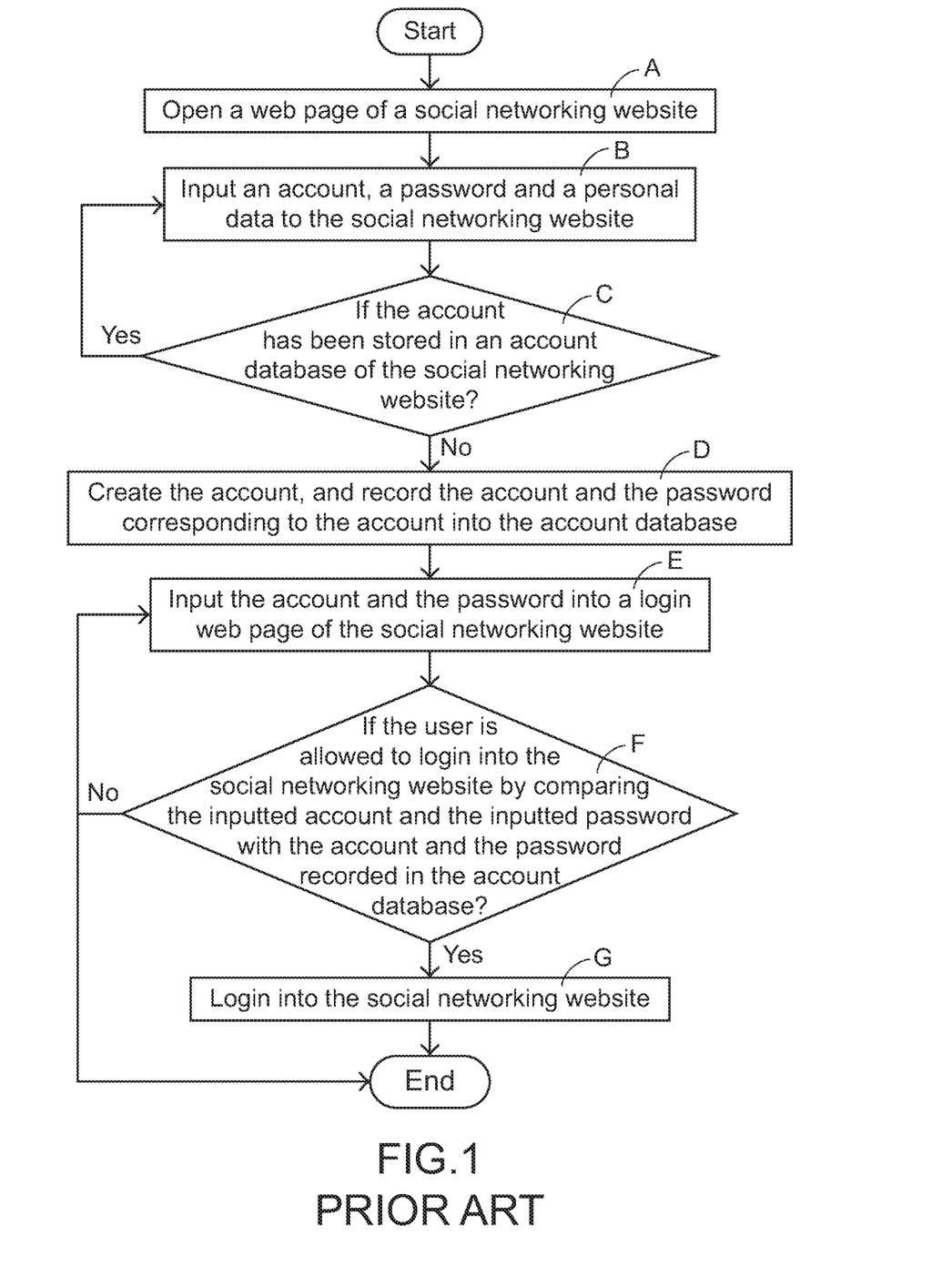
FIG. 1 is a flowchart illustrating a conventional account creating and authenticating method.

Hereinafter, a conventional account creating and authenticating method will be illustrated with reference to FIG. 1. FIG. 1 is a flowchart illustrating a conventional account creating and authenticating method. For example, the conventional account creating and authenticating method is applied to a social networking website. The conventional account creating and authenticating method comprises the following steps. Firstly, in the step A, a web page of a social networking website is opened. Then, in the step B, an account, a password and a personal data are inputted into the social networking website. In the step C, the social networking website will search whether the account has been stored in an account database of the social networking website. In the step D, the account is created, and the account and the password corresponding to the account are recorded into the account database. In the step E, the account and the password are inputted into a login web page of the social networking website. In the step F, the social networking website judges whether the user is allowed to login into the social networking website by comparing the inputted account and the inputted password with the account and the password recorded in the account database. In the step G, the user is allowed to login into the social networking website.

In the step C, if the social networking website judges that the account has been stored in an account database of the social networking website, the step B is repeatedly done. Whereas, if the social networking website judges that the account has not been stored in an account database of the social networking website, the step D is done. If the step F, if the inputted account and the inputted password comply with the account and the password recorded in the account database, the step F is done. Whereas, if the inputted account and the inputted password do not comply with the account and the password recorded in the account database, the step E is done or the account creating and authenticating method is ended.

From the above discussions, while the account creating process of the conventional account creating and authenticating method is performed, the account applicant needs to think out an unusual account and a great number of personal data (e.g. names, electronic mails or the like) should be inputted. That is, the conventional account creating process is very troublesome. Moreover, during the account authenticating process, the user needs to firmly remember the account and the password in order to login into the social networking website. Under this circumstance, the conventional account creating and authenticating method become hindrance for the users who are unfamiliar to operations of computers or electronic devices (e.g. the elderly or younger users).

Therefore, there is a need of providing an improved account creating and authenticating method which is easily operated.

SUMMARY OF THE INVENTION

The present invention provides an account creating and authenticating method which is easily operated.

In accordance with an aspect of the present invention, there is provided an account creating and authenticating method for creating an account of a service system and using the account to login into the service system. The account creating and authenticating method includes an account creating process and an account authenticating process. The account creating process includes steps of displaying at least one photo for allowing a user to designate a face image of an account applicant in the at least one photo, transmitting the face image of the account applicant to the service system, and assigning a specified account and a specified password to the account applicant. The account authenticating process includes steps of using an image pickup device to shoot a face of a login person so as to generate at least one face image of the login person, transmitting the face image of the login person to the service system, and judging whether the shot face image of the login person complies with a predetermined face image corresponding to an existing account. If the shot face image of the login person complies with the predetermined face image corresponding to the existing account, the login person is allowed to login into the service system.

In an embodiment, if the shot face image of the login person complies with the predetermined face image corresponding to the existing account, the account creating and authenticating method further comprises a step of displaying the specified account and the specified password corresponding to the face image of the login person. Whereas, if the shot face image of the login person is not provided, the login person is allowed to login into the service system by inputting the specified password.

In an embodiment, while the account creating process is performed, a plurality of photos are displayed for allowing the user to designate a plurality of face images of the account applicant, and the plurality of face images of the account applicant are transmitted to the service system.

In an embodiment, the plurality of face images of the account applicant includes a facing-left face image, a facing-right face image, a facing-up face image, a facing-down face image and a front face image.

In an embodiment, the account authenticating process further includes a step of constructing the plurality of faces images of the account applicant as a three-dimensional face image of the account applicant.

In an embodiment, while the account authenticating process is performed, a face of the login person at different angles is photographed by the image pickup device, so that plural face images of the login person are generated.

In accordance with another aspect of the present invention, there is provided an account creating and authenticating method for a photo sharing system. The account creating and authenticating method includes the following steps. Firstly, a photo browser and a photo sharing platform are provided. The photo browser and the photo sharing platform are in communication with each other through an internet. Then, the photo browser is operated to display at least one photo for allowing a user to designate a face image of an account applicant in the at least one photo. Then, the photo browser is operated to transmit the face image of the account applicant to a photo sharing platform. Then, a specified account and a specified password are assigned to the account applicant by the photo sharing platform. Then, an image pickup device is used to shoot a face of a login person, thereby generating at least one face image of the login person. Then, the photo browser is operated to transmit the shot face image of the login person to the photo sharing platform. If the photo sharing platform judges that the shot face image of the login person complies with a predetermined face image corresponding to an existing account, the login person is allowed to login into the photo sharing platform.

In an embodiment, if the shot face image of the login person complies with the predetermined face image corresponding to the existing account, the specified account and the specified password corresponding to the face image of the login person are displayed on the photo browser. Whereas, if the shot face image of the login person is not provided, the login person is allowed to login into the photo sharing platform by inputting the specified password.

In an embodiment, a plurality of photos are displayed on the photo browser for allowing the user to designate a plurality of face images of the account applicant, and the plurality of face images of the account applicant are transmitted to the photo sharing platform.

In an embodiment, the plurality of face images of the account applicant includes a facing-left face image, a facing-right face image, a facing-up face image, a facing-down face image and a front face image.

In an embodiment, the plural faces images of the account applicant are constructed as a three-dimensional face image of the account applicant by the photo sharing platform.

In an embodiment, a series of facial angle guiding messages are displayed on the photo browser. According to the facial angle guiding messages, a face of the login person at different angles is shot by the image pickup device, so that a plurality of face images of the login person are generated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides an account creating and authenticating method. The account creating and authenticating method may be applied to a photo sharing system. Hereinafter, the architecture of a photo sharing system will be illustrated with reference to FIG. 2.

Figure 2:
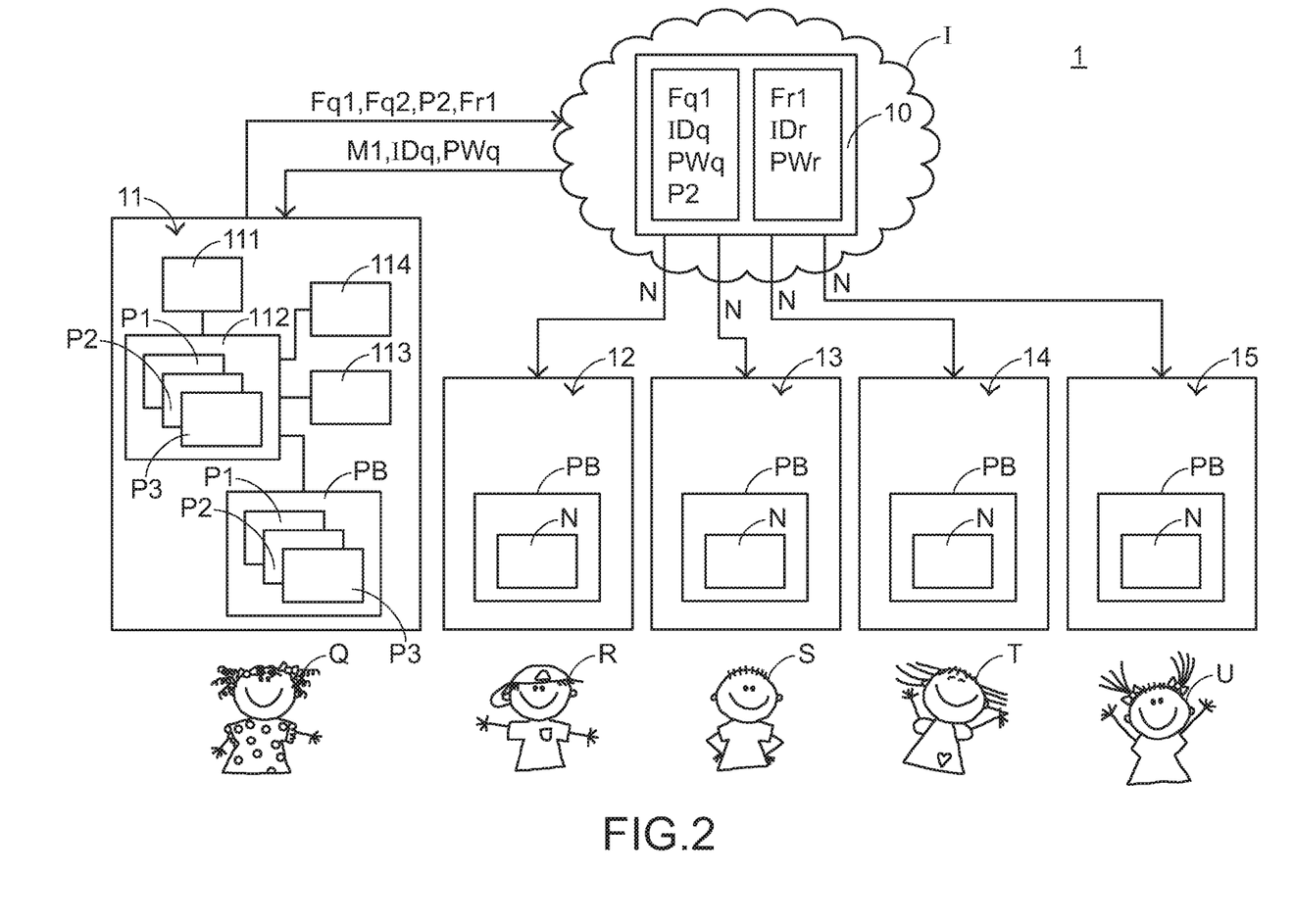
FIG. 2 is a schematic functional block diagram illustrating the architecture of a photo sharing system according to a first embodiment of the present invention.

FIG. 2 is a schematic functional block diagram illustrating the architecture of a photo sharing system according to a first embodiment of the present invention. As shown in FIG. 2, the photo sharing system 1 comprises a service system 10, a first electronic device 11, a second electronic device 12, a third electronic device 13, a fourth electronic device 14, and a fifth electronic device 15. The first electronic device 11 is operated by a first user Q. The second electronic device 12 is operated by a second user R. The third electronic device 13 is operated by a third user S. The fourth electronic device 14 is operated by a fourth user T. The fifth electronic device 15 is operated by a fifth user U. In addition, a photo browser PB is installed in each of the first electronic device 11, the second electronic device 12, the third electronic device 13, the fourth electronic device 14 and the fifth electronic device 15. Each of the first electronic device 11, the second electronic device 12, the third electronic device 13, the fourth electronic device 14 and the fifth electronic device 15 is in communication with the service system 10 through an internet I by means of the photo browser PB. Consequently, photos can be transmitted from each electronic device to the service system 10 through the photo browser PB, and the photos can be further shared to other electronic devices. In this embodiment, the photo browser PB is installed in each of the electronic devices 11~15 by executing a software. In addition, the service system 10 is a photo sharing platform.

The configuration of the electronic device will be illustrated will be illustrated as follows. Take the first electronic device 11 for example. In addition to the photo browser PB, the first electronic device 11 further comprises a first image pickup device 111, a first storage unit 112, a first screen 113 and a first network module 114. The first image pickup device 111 is disposed on the first electronic device 11 for shooting photos. The first storage unit 112 is connected with the first image pickup device 111 for storing the photos. The first screen 113 is disposed on the first electronic device 11 and connected with the first storage unit 112 for displaying the photo browser PB, so that the photos are viewable through the photo browser PB. The first network module 114 is connected with the first storage unit 112. Through the first network module 114, the first electronic device 11 is in communication with the network I to transmit photos. The configurations of each of the electronic devices 12~15 are similar to those of the first electronic device 11, and are not redundantly described herein. In this embodiment, the first electronic device 11, the second electronic device 12, the third electronic device 13, the fourth electronic device 14 and the fifth electronic device 15 are all tablet personal computers. In addition, the first screen 113 is a touch screen. Of course, these electronic devices are not limited to tablet personal computers. For example, these electronic devices may be desktop computers, notebook computers or smart phones. These electronic devices are identical or different types of electronic computers.

Figure 3:
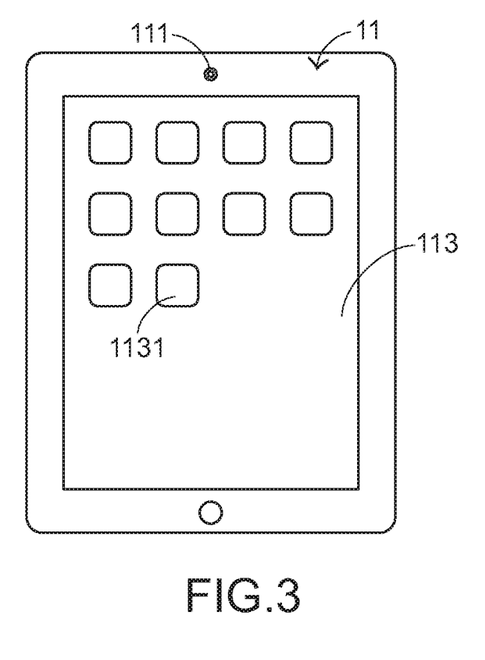
FIG. 3 schematically illustrates the outward appearance of the first electronic device of the photo sharing system according to an embodiment of the present invention, in which the photo browser is activated.

Please refer to FIGS. 3-10 sequentially. FIG. 3 schematically illustrates the outward appearance of the first electronic device of the photo sharing system according to an embodiment of the present invention, in which the photo browser is activated. As shown in FIG. 3, the outward appearance of the first electronic device 11 comprises the first image pickup device 111 and the first screen 113. In addition, a shortcut icon 1131 corresponding to the photo browser PB is displayed on the first screen 113. When the first user Q wants to share photos to other users R, S, T and U through the photo sharing platform 10, the first user Q may firstly click the shortcut icon 1131 displayed on the first screen 113. Meanwhile, since the photo browser PB is activated, a login interface 101 is displayed on the first screen 113 of the first electronic device 11 (see FIG. 4). In this embodiment, a way of clicking the shortcut icon 1131 is performed by touching the shortcut icon 1131.

Figure 4:
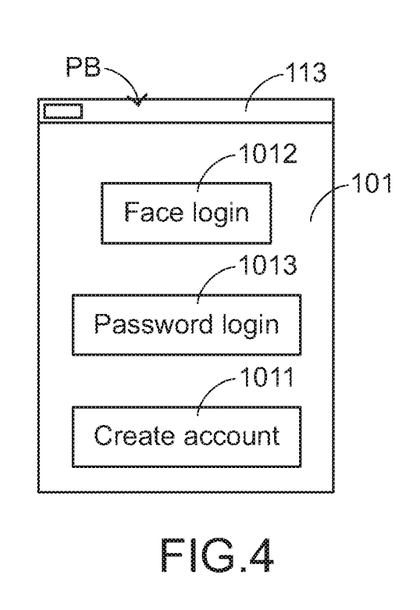
FIG. 4 schematically illustrates a login interface of the photo sharing platform of the photo sharing system according to an embodiment of the present invention.

Please refer to FIG. 4. The login interface 101 comprises a plurality of selective items. In this embodiment, the login interface 101 comprises an account creating selective item 1011, a face login selective item 1012, and a password login selective item 1013. By clicking the account creating selective item 1011, an account creating interface 102 (see FIG. 5) of the photo sharing platform 10 is created. Through the account creating interface 102, an account applicant may apply for an account of the photo sharing platform 10. By clicking the face login selective item 1012, a face login interface 103 (see FIG. 6) of the photo sharing platform 10 is created. Through the face login interface 103, a user may login into the photo sharing platform 10 by a face recognition technology. By clicking the password login selective item 1013, a password login interface (not shown) is created. Through the password login interface, the user may login into the photo sharing platform 10 by inputting a password.

Figure 5:
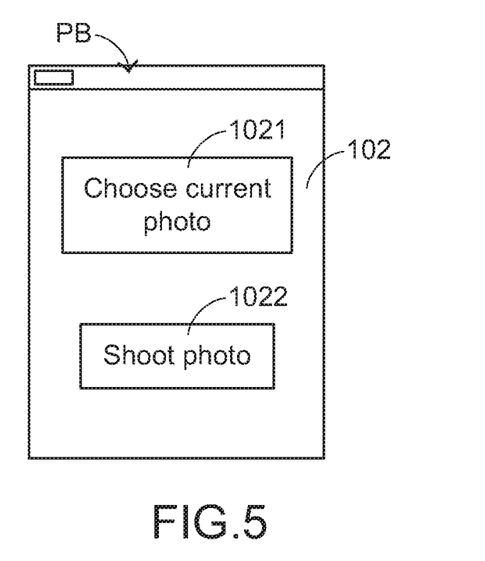
FIG. 5 schematically illustrates an account creating interface of the photo sharing platform of the photo sharing system according to an embodiment of the present invention.
Figure 6:
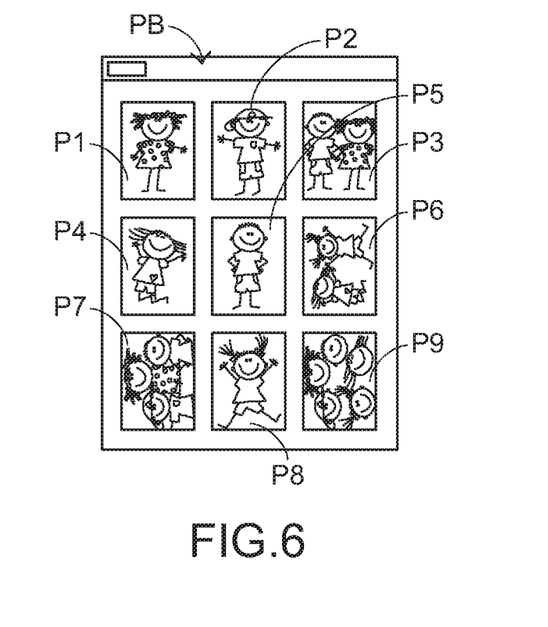
FIG. 6 schematically illustrates a plurality of photos displayed on the photo sharing platform of the photo sharing system according to an embodiment of the present invention.
Figure 7:
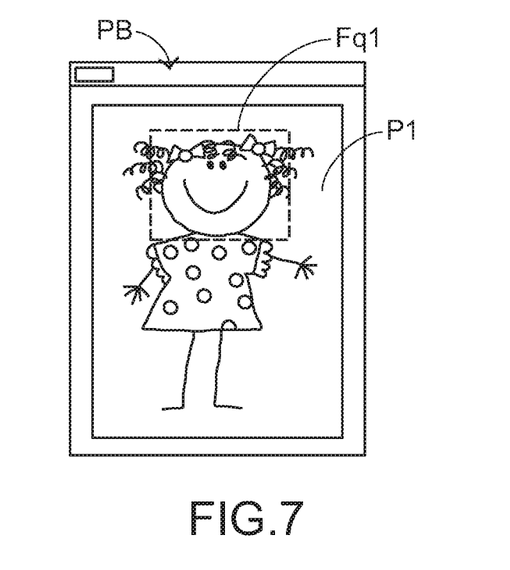
FIG. 7 schematically illustrates a photo displayed on the photo sharing platform of the photo sharing system according to an embodiment of the present invention.
Figure 8:
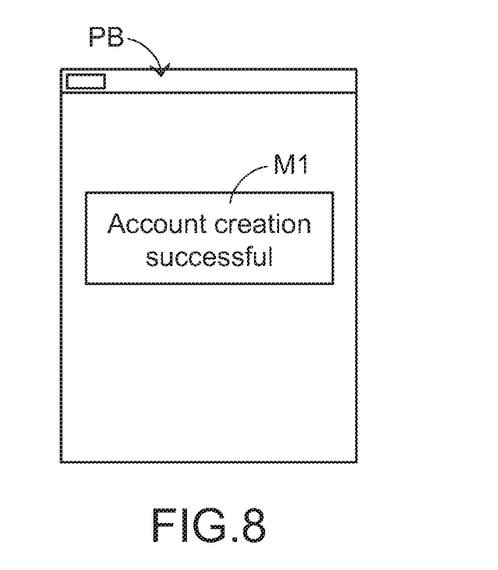
FIG. 8 schematically illustrates an "account creation successful" message displayed on the photo browser of the photo sharing system according to an embodiment of the present invention.

In a case that the first user Q has no account of the photo sharing platform 10, the first user Q may click the account creating selective item 1011 of the login interface 101, so that the account creating interface 102 of the photo sharing platform 10 is displayed on the photo browser PB (see FIG. 5). The account creating interface 102 comprises a current photo choosing selective item 1021 and a photo shooting selective item 1022. By clicking the current photo choosing selective item 1021, the first storage unit 112 of the first electronic device 11 is accessible. Meanwhile, a plurality of photos P1~P9 that are previously stored in the first storage unit 112 are displayed on the photo browser PB in a photo wall arrangement. As shown in FIG. 6, the plurality of photos P1~P9 are displayed on the photo browser PB. By clicking the photo shooting selective item 1022, the first image pickup device 111 is enabled to shoot the face of the account applicant, thereby acquiring a photo including a face image of the account applicant.

Whenever each of the above login approaches is performed by the first user Q, the photo P1 containing the face image of the account applicant (i.e. the account applicant is the first user Q at this moment). In addition, the photo P1 is displayed on the photo browser (see FIG. 7). Then, the face portion of the account applicant in the photo P1 (i.e. the first user Q) is circumscribed by the first user Q, so that the circumscribed portion is designated as a face image Fq1 of the first user Q. In this embodiment, the face image Fq1 is a front face image of the first user Q. After the face image Fq1 of the first user Q is designated, the photo browser PB is in communication with the first electronic device 11 and the photo sharing platform 10 through the first network module 114 and the internet I, and thus the face image Fq1 is transmitted from the photo browser PB to the photo sharing platform 10.

After the face image Fq1 is received by the photo sharing platform 10, the face image Fq1 is processed by the photo sharing platform 10 according to a face recognition technology, so that the features of the face image Fq1 are acquired. In addition, an account IDq and a password PWq corresponding to the features of the face image Fq1 are created according to the features of the face image Fq1. The account IDq and the password PWq are stored in the photo sharing platform 10. After the account of the photo sharing platform 10 is successfully created, the photo sharing platform 10 will issue an "account creation successful" message M1 to the first electronic device 11. In addition, the "account creation successful" message M1 is displayed on the photo browser PB (see FIG. 8).

Figure 9:
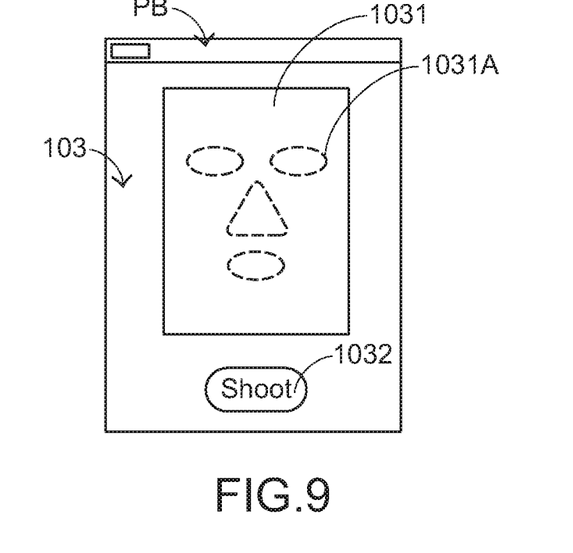
FIG. 9 schematically illustrates a face login interface of the photo sharing system according to an embodiment of the present invention.

After the account of the photo sharing platform 10 is successfully created, the first user Q may login into the photo sharing platform 10 through the login interface 101. In a case that the face login selective item 1012 is clicked by the first user Q, the face login interface 103 of the photo sharing platform 10 and the first image pickup device 111 are both activated. The face login interface 103 is shown in FIG. 9. As shown in FIG. 9, the face login interface 103 comprises a real-time shooting window 1031 and a shooting selective item 1032. Through the real-time shooting window 1031, the face image of a login person (i.e. the first user Q) can be viewed by the login person. By clicking the shooting selective item 1032, the face image shown on the real-time shooting window 1031 is shot by the first image pickup device 111. In addition, a face-alignment mark 1031A is shown on the real-time shooting window 1031. The login person may align the facial features of the face image of the login person with the face-alignment mark 1031A in order to facilitate shooting the face image of the login person. After the facial features of the face image of the login person are aligned with the face-alignment mark 1031A, a face image Fq2 is acquired to facilitate more precise analysis and recognition on the facial features by the photo sharing platform 10. In this embodiment, the face-alignment mark 1031A is used for aligning the facial features of the front face image of the login person. In addition, the face image Fq2 is also a front face image.

Figure 10:
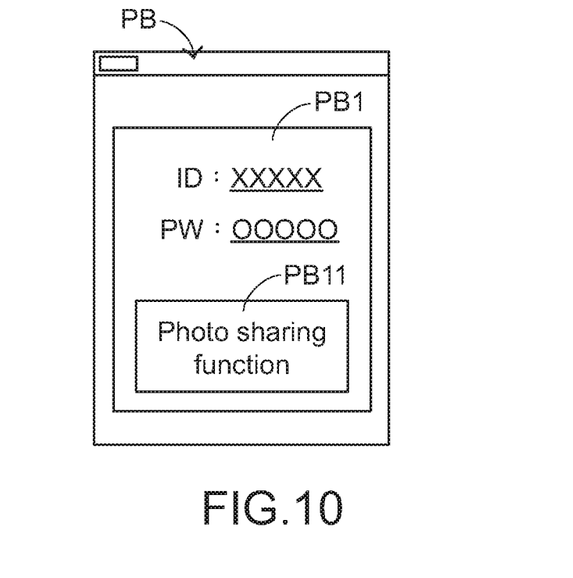
FIG. 10 schematically illustrates a password displaying interface of the photo sharing system according to an embodiment of the present invention.

Moreover, by executing an application program (not shown) of the photo sharing platform 10, the shot face image Fq2 is compared with the face image Fq1 corresponding to the account IDq. If the face image Fq2 complies with the face image Fq1, the photo sharing platform 10 will transmit the account IDq and the corresponding password PWq to the photo browser PB. Moreover, the account IDq and the password PWq are displayed on a password displaying interface PB1. Through the password displaying interface PB1, the password PWq may be viewed and realized by the first user Q. The password displaying interface PB1 is shown in FIG. 10. As shown in FIG. 10, the password displaying interface PB1 further comprises a photo sharing function selective item PB11. By clicking the photo sharing function selective item PB11, the photo sharing platform 10 is accessible. If the face image Fq2 does not comply with the face image Fq1, the first user Q is not allowed to login into the photo sharing platform 10. Meanwhile, the login interface 101 is displayed on the photo sharing platform 10 again, so that the first user Q may try to login into the photo sharing platform 10 again.

Please refer to FIG. 2. After the account authenticating process is completed, the photo browser PB of the first electronic device 11 may be operated by the first user Q to transmit the photo P2 to the photo sharing platform 10. In addition, a sharing notification message N corresponding to the photo P2 may be transmitted from the photo sharing platform 10 to other electronic devices 12~15. According to the sharing notification message N, the other users R, S, T and U may determine whether the shared photo is viewed or not.

After the password PWq is acquired by the first user Q, the first user Q may login into the photo sharing platform 10 by clicking the face login selective item 1012. Alternatively, by clicking the password login selective item 1013, the first user Q may input the password PWq to login into the photo sharing platform 10. For example, if another electronic device with no image pickup device is operated by the first user Q, the first user Q may login into the photo sharing platform 10 by inputting the password PWq. Of course, the first user Q may inform the second user R about the account and the password PWq. Consequently, the second user R may use the password PWq of the first user Q to login into the photo sharing platform 10 in order to help the first user Q to operate the photo sharing platform 10.

In some embodiments, the photo P3 including a face image Fr1 of the second user R (see FIG. 6) is processed by the first user Q, and then an account IDr and a password PWr corresponding to the face image Fr1 is created by performing the above account creating process. Under this circumstance, the account applicant is the first user Q, but the login person is the second user R corresponding to the face image Fr1. The account IDr may be authenticated according to the face image of the second user R. Similarly, the photo P9 including the face images of the third user S, the fourth user T and the fifth user U (see FIG. 6) is processed by the first user Q, and then the accounts corresponding to the third user S, the fourth user T and the fifth user U are created by performing the above account creating process. That is, the account creating and authenticating method may allow any user to create an account for the user himself (herself) or other person by using photos. However, only the login person with the face image corresponding to the account can be authenticated to login into the service system and acquire the password. Moreover, while the account creating process is performed, different accounts are assigned to the to-be-transmitted face images by the photo sharing platform 10. Under this circumstance, it is not necessary for the account applicant to think out an unusual account, and it is not necessary for the login person to firmly remember the password. In other words, the login person can directly login into the service system by means of the face image.

Moreover, while the account creating process is performed, if the face image Fq1 transmitted to the photo sharing platform 10 is considered as a blurred image or an unqualified image (for example the face angle is too large), the photo sharing platform 10 will issue a corresponding prompt to the photo browser PB to inform the first user Q that another photo with a qualified image face is needed to create the account. Moreover, if the photo sharing platform 10 judges that the account IDq corresponding to the face image Fq1 has been created by judging the face image Fq1, the photo sharing platform 10 will issue another corresponding prompt to the photo browser PB to inform the first user Q that the account IDq has been created. On the other hand, the face image Fq1 is also stored in the photo sharing platform 10 for strengthening the face image database corresponding to the account IDq and reducing the possibility of erroneous judgment in face image recognition. Of course, during the process of sharing photos, the face image of each photo is also captured by the photo sharing platform 10 and stored in the face image database corresponding to the account, so that the face image database is strengthened.

In this embodiment, while the account creating process is performed, the account IDq corresponding to the face image Fq1 in the photo P1 can be created by simply transmitting the photo P1 to the photo sharing platform 10. In some other embodiments, the account creating process is performed by selecting a plurality of photos and designating a plurality of face images of the account applicant in the photos. The plurality of face images of the account applicant includes a facing-left face image, a facing-right face image, a facing-up face image, a facing-down face image and a front face image. Next, the plurality of faces images of the account applicant are transmitted from the photo browser to the photo sharing platform. The plurality of faces images of the account applicant are constructed as a three-dimensional face image of the account applicant by the photo sharing platform, so that the face image data are more integral.

In a preferred embodiment, while the account authenticating process is performed, the face image Fq2 is acquired by referring to the face-alignment mark 1031A. Moreover, the face image Fq2 is a front face image. In some other embodiments, the three-dimensional face image of the account applicant has been created while the account creating process is performed. while the account authenticating process is performed, a series of facial angle guiding messages are displayed on the photo browser to inform the login person that a plurality of face images will be photographed. Consequently, various face images of the login person at different shooting angles (e.g. a facing-left face image, a facing-right face image, a facing-up face image, a facing-down face image and a front face image) may be acquired by the image pickup device. In such way, the face image of the login person can be acquired more precisely for allowing the login person to login into the photo sharing platform. Since various face images of the login person at different shooting angles are acquired, even if a non-account person is located near the login person to shoot the image of the login person, the problem of account misappropriation will be avoided.

Figure 11:
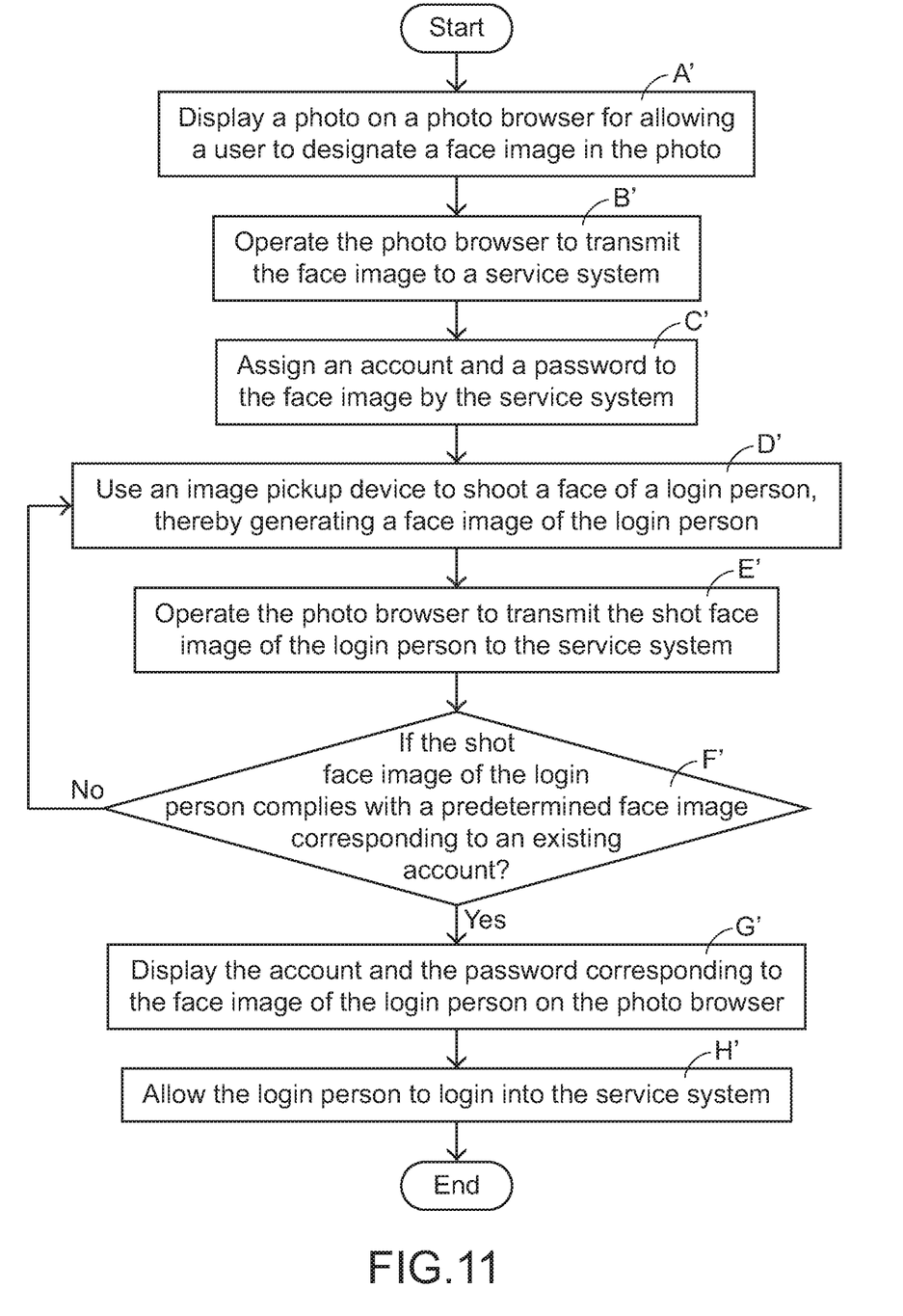
FIG. 11 is a flowchart illustrating an account creating and authenticating method according to an embodiment of the present invention.

FIG. 11 is a flowchart illustrating an account creating and authenticating method according to an embodiment of the present invention. As shown in FIG. 11, the account creating and authenticating method comprises an account creating process and an account authenticating process. The account creating process comprises steps A', B' and C'. In the step A', a photo is displayed on a photo browser for allowing a user to mark a face image in the photo. In the step B', the photo browser is operated to transmit the face image to a service system. In the step C', an account and a password are assigned to the face image by the service system. The account authenticating process comprises steps D', E', F', G' and H'. In the step D', an image pickup device is used to shoot a face of a login person, thereby generating a face image of the login person. In the step E', the photo browser is operated to transmit the shot face image of the login person to the service system. In the step F', the service system judges whether the shot face image of the login person complies with a predetermined face image corresponding to an existing account. In the step G', the account and the password corresponding to the face image of the login person are displayed on the photo browser. In the step H', the login person is allowed to login into the service system.

In the step F', if the service system judges that the shot face image of the login person does not comply with the predetermined face image corresponding to the existing account, the step D' is repeatedly done. Whereas, if the service system judges that the shot face image of the login person complies with the predetermined face image corresponding to the existing account, the step G' is done.

From the above description, the present invention provides an account creating and authenticating method. The account creating and authenticating method includes an account creating process and an account authenticating process. During the account creating process, a photo including a face image is used to create an account. Consequently, the user can create accounts for other account applicants who are unfamiliar to computers or electronic devices. Moreover, during the account creating process, it is not necessary for the account applicant to think out an unusual account and input a great number of personal data. During the account authenticating process, it is simple to provide the face image of the login person to the service system for comparison. If the face image of the login person complies with a predetermined image, the login person is allowed to directly login into the service system or acquire the account and the password. In other words, even if the login person forgets the password, the login person is still able to login into the service system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An account creating and authenticating method for creating an account in a service system and using said account to login into said service system, said account creating and authenticating method comprising:

an account creating process, which comprises steps of:
displaying at least one photo on a photo browser on an electronic device comprising a first storage unit containing a plurality of photos stored therein, wherein said at least one photo is selected from said plurality of photos and is displayed to allow a user to view and designate a face image of an account applicant in said at least one photo;
transmitting said designated face image of said account applicant from said electronic device to said service system; and
assigning a specified account and a specified password corresponding to said designated face image to said account applicant by said service system; and
an account authenticating process, which comprises steps of:
using an image pickup device on said electronic device to photograph a face of a login person, thereby generating at least one photographed face image of said login person;
transmitting said photographed face image of said login person to said service system; and
judging whether said photographed face image of said login person complies with said designated face image, wherein if said photographed face image of said login person complies with said designated face image, said login person is allowed to login into said service system as said account applicant, wherein if said photographed face image of said login person complies with said designated face image, said account creating and authenticating method further comprises a step of said service system transmitting said specified account and said specified password to said electronic device, and said electronic device displaying said specified account and said specified password corresponding to said designated face image on the photo browser.

2. The account creating and authenticating method according to claim 1 wherein in said account creating process, more than one of said plurality of photos are selected and displayed for designating respective face images in said selected photos, which are to be combined to form said designated face image of said account applicant.

3. The account creating and authenticating method according to claim 2 wherein said face images combined to form said designated face image of said account applicant includes a facing-left face image, a facing-right face image, a facing-up face image, a facing-down face image and a front face image.

4. The account creating and authenticating method according to claim 3 wherein in said account authenticating process, said faces images are combined to form said designated face image of said account applicant as a three-dimensional face image of said account applicant.

5. The account creating and authenticating method according to claim 1 wherein in said account authenticating process, said login person is photographed by facing at different angles from said image pickup device, so that a plurality of face images of said login person are generated.

6. An account creating and authenticating method for a photo sharing system, said account creating and authenticating method comprising steps of:
providing an electronic device comprising a photo browser that communicates with a photo sharing platform through an internet;
operating said photo browser to display at least one photo on said electronic device, wherein said electronic device comprises a first storage unit containing a plurality of photos stored therein, wherein said at least one photo is selected from said plurality of photos and is displayed to allow a user to view and designate a face image of an account applicant in said at least one photo;
operating said photo browser to transmit said designated face image of said account applicant to said photo sharing platform;
assigning a specified account and a specified password corresponding to said designated face image to said account applicant by said photo sharing platform;

using an image pickup device on said electronic device to photograph a face of a login person, thereby generating at least one photographed face image of said login person;

operating said photo browser to transmit said photographed face image of said login person to said photo sharing platform; and if said photo sharing platform judges that said photographed face image of said login person complies with said designated face image, allowing said login person to login into said photo sharing platform as said account applicant and said photo sharing platform transmitting said specified account and said specified password to said electronic device, and said specified account and said specified password corresponding to said designated face image of said login person are displayed on said photo browser.

7. The account creating and authenticating method according to claim 6 wherein more than one of said plurality of photos are selected and displayed on said photo browser for designating respective face images in said selected photos, which are to be combined to form said designated face image of said account applicant.

8. The account creating and authenticating method according to claim 7 wherein said respective face images combined to form said designated face image of said account applicant includes a facing-left face image, a facing-right face image, a facing-up face image, a facing-down face image and a front face image.

9. The account creating and authenticating method according to claim 8 wherein said respective faces images are combined to form said designated face image of said account applicant as a three-dimensional face image of said account applicant by said photo sharing platform.

10. The account creating and authenticating method according to claim 6 wherein a series of facial angle guiding messages are displayed on the photo browser, wherein according to said facial angle guiding messages, said login person is photographed by facing at different angles from said image pickup device, so that a plurality of face images of said login person are generated.

* * * * *